(12) United States Patent
Saunders et al.

(10) Patent No.: US 6,324,750 B1
(45) Date of Patent: Dec. 4, 2001

(54) ARCHITECTURAL SYSTEM FOR ADJUSTABLY RECREATING A VEHICLE INTERIOR AND METHOD OF CONSTRUCTING A VEHICLE ARCHITECTURE

(75) Inventors: William P. Saunders, Bloomfield; Dennis M. Rafferty, Birmingham, both of MI (US)

(73) Assignee: DMR Investments, LLC, Birmingham, MI (US)

( * ) Notice: Subject to any disclaimer, the term of this patent is extended or adjusted under 35 U.S.C. 154(b) by 0 days.

(21) Appl. No.: 09/420,346

(22) Filed: Oct. 19, 1999

(51) Int. Cl.[7] ........................................ B23P 21/00
(52) U.S. Cl. .................... 29/721; 29/281.5; 29/897.2; 434/62
(58) Field of Search .................. 29/897.2, 720, 29/721, 281.5, 281.1, 464, 466, 468; 269/45, 111, 287; 52/79.6, 653.1; 434/62, 63, 67, 69

(56) References Cited

U.S. PATENT DOCUMENTS

| | | | |
|---|---|---|---|
| 1,161,920 | * 11/1915 | Bishop | 434/67 |
| 1,162,759 | * 12/1915 | Ferris | 269/111 |
| 2,591,512 | * 4/1952 | Conner | 269/45 |
| 3,913,286 | * 10/1975 | Boutacoff | 52/653.1 |
| 3,942,297 | * 3/1976 | Kitagawa | 52/653.1 |
| 4,555,836 | 12/1985 | Martin . | |
| 4,863,663 | 9/1989 | Nico, Jr. et al. . | |
| 4,867,922 | 9/1989 | Zuccato . | |
| 4,936,021 | * 6/1990 | Frenette et al. | 269/45 |
| 5,231,749 | 8/1993 | Hutchison . | |
| 5,273,803 | 12/1993 | Metcalf . | |
| 5,384,704 | * 1/1995 | Snyder et al. | 264/424.01 |
| 5,729,463 | * 3/1998 | Koenig et al. | 364/468.04 |
| 5,733,582 | * 3/1998 | Johnson | 425/110 |
| 5,774,969 | * 7/1998 | Zuccato | 29/407.05 |
| 5,810,596 | * 9/1998 | Van Lookeren Campagne | 434/62 |
| 5,919,045 | * 7/1999 | Tagge et al. | 434/62 |
| 5,921,049 | * 7/1999 | Sugiyama | 52/653.1 |
| 5,924,248 | * 7/1999 | Cox et al. | 52/653.1 |
| 5,951,018 | * 9/1999 | Mamitsu | 434/62 |
| 6,043,854 | * 3/2000 | Scott | 434/69 |
| 6,079,982 | * 6/2000 | Meader | 434/62 |

* cited by examiner

*Primary Examiner*—I Cuda Rosenbaum
*Assistant Examiner*—T. Nguyen
(74) *Attorney, Agent, or Firm*—Gifford, Krass, Groh, Sprinkle, Anderson & Citkowski, P.C.

(57) ABSTRACT

A system for adjustably recreating an interior architecture of a vehicle and a method of constructing the interior architecture. A platform is constructed of a plurality of planar shaped floor plates arrayed in coplanar fashion. A cage is constructed upon the platform and includes first vertically extending and telescoping supports which are secured at selected locations along edges of the platform. Second horizontally extending supports interconnect top ends of the first vertically extending supports and both the first and second supports are axially adjustable in length to define a specified interior volume of the cage. A series of generic form patterns corresponding to interior/exterior components of a vehicle are assembled upon the platform and within the interior volume of the cage and are further capable of being easily and manually repositioned relative one another to ergonomic testing without regard to particular styling or ornamentation.

16 Claims, 7 Drawing Sheets

ARCHITECTURAL SYSTEM FOR ADJUSTABLY RECREATING A VEHICLE INTERIOR AND METHOD OF CONSTRUCTING A VEHICLE ARCHITECTURE

BACKGROUND OF THE INVENTION

1. Field of the Invention

The present invention relates generally to vehicle modeling and design systems and, more particularly, to an architectural system for adjustably recreating a vehicle interior which is particularly useful in assisting automakers in accurately and inexpensively establishing a given set of vehicle interior dimensions for ergonomic testing and without regard to a particular exterior vehicle styling or ornamentation.

2. Description of the Prior Art

The relevant prior art is concerned with the creation of vehicle interior designs. Traditionally, the designing of vehicle dimensions, both exterior and interior, was accomplished by a fairly sizeable number of individuals constructing a vehicle model out of a large quantity of clay. Unfortunately, a combination of factors including the number of individuals involved, the material cost of the raw material, and the relatively large number of hours required in constructing the model make it unduly burdensome for automakers to construct such vehicle designs. An additional drawback with clay modeling designs is that they are drawn primarily to illustrating exterior vehicle dimensions and ornamentation and do not do a good job of establishing accurate vehicle interior dimensions.

More recently, vehicle designing, both interior and exterior, has been accomplished through the use of computer aided designing (CAD) techniques. As is known in the art, a fairly powerful computer is loaded with appropriate drafting software which an operator utilizes to create desired vehicle dimensioning. An obvious drawback of CAD designing is that it does not provide any type of life-like replication of vehicle interiors and exteriors and, furthermore, its use renders it largely impossible to achieve any desired dimensioned and ergonomic "feel" of a vehicle interior.

An example of a method of making a unified interior and exterior design verification model drawn for CAD machines is set forth in U.S. Pat. No. 5,231,749, issued to Hutchison. The method of Hutchison includes the steps of defining a series of separable parts of the interior and exterior designs according to distinct mathematical models. A series of bench mark planes are provided within the interior and exterior surfaces of the design and the interior and exterior portions are separated from each other at the bench mark plane when the interior portion is formed and the interior and exterior portions are assembly together at the bench mark plane. Finally, the separable parts or modules are assembled together at the bench mark plane and the present method provides for the disassembly of the particular modules and their modification in holding fixtures.

Other examples drawn from the prior art include U.S. Pat. No. 4,555,836, issued to Martin, which teaches a method of making a prototype from concept drawings and which includes building a skeletal body of interlocking and substantially rigid templates on a frame. The frame in turn is constructed of tubing members and panels and is fitted with wheels to facilitate transporting of the prototype. The templates are then traced on polystyrene foam pattern pieces sized to fill the spaces between the templates and pattern pieces are then attached to the frame and shaped to the desired design contour surface.

SUMMARY OF THE PRESENT INVENTION

The present invention is a novel and simplified approach for the creation of a desired architectural design of a vehicle interior. The invention is primarily directed to the ability to quickly and efficiently create a vehicle interior architecture, utilizing generic forms for such interior components as instrument panels, roof headliner, pillars, consoles, floor and door sills, and in addition to stylized exterior components such as doors, hood and roof, which provides actual vehicle perspective to an individual seated within the constructed vehicle architecture, and which provides for quick and easy adjustment of the forms relative to one another and to permit the interior dimensions of the established architecture to be quickly altered for purposes of ergonomic testing. The present invention is also concerned with the provision of a vehicle architectural system which utilizes simplified and inexpensive generic form pieces and which assists in the establishment of the desired interior architecture without other distractions as to an ornamental appearance of either the vehicle interior or exterior.

The architectural system includes a platform constructed of a plurality of planar shaped floor plates which are arrayed in end-to-end and coplanar fashion relative to one another. The floor plates are translatable along first and second established axes along a two dimensional plane so as to establish an overall surface area upon which the vehicle architecture is constructed.

A cage is constructed upon the platform and includes the provision of a first plurality of elongate and vertically extending supports and a second plurality of horizontally extending and interconnecting supports. The vertical supports are secured to mounting apertures located within the floor plates at specified locations along the edges of the plates and the horizontal supports interconnect between top ends of the first plurality of vertical supports. Both the first and second pluralities of supports are further constructed of elongate and tubular members, each having first and second axially telescoping portions, and such that a specified interior volume of the cage is established by adjusting the first and second pluralities of supports to desired positions.

A series of generic forms are provided and which are patterned to correspond to selected interior and exterior components of a vehicle upon which it is desired to recreate its interior architecture. Included among these patterns are such elements as a floor console and door sills which are supported in a desired positioning upon the adjusted platform surface and additional elements including door pillars and attaching strip portions, interior door panels, roof headliners, instrument panel, dashboard and the like. The forms utilized according to the present invention are typically constructed of a foamable material having the requisite characteristics of flexibility and resiliency and which are further covered by a dark fabric, such as gray or black, and so as not to distract from the established objective of evaluating the ergonometry of the interior vehicle architecture by introducing other distracting design features. It is also contemplated that the forms may be constructed of wooden forms or the like without departing from the scope of the invention.

The additional pattern elements are secured at selected locations within the specified volume of the cage through the use of elongate fasteners, each including a shaft which receives a threaded nut to define the shaft into a first threaded end and a second extending and indicia indicating end. Each of the nuts abuts against an exterior facing surface of a selected elongate extending support of the cage (vertically or horizontally extending) and the second shaft portions extend inwardly through apertures in the elongate supports to engage selected locations of the associated forms such as the pillars for interconnecting the door panels and the roof headliner. The indicia on the second extending ends of the shafts further includes dimensional markings which interact with rotational displacement of the nut to permit rapid manual repositioning of the forms relative to one another.

A method for recreating a vehicle interior according to the present invention is also disclosed and includes the steps of obtaining a set of critical dimensions of a desired vehicle interior configuration and obtaining computer aided artwork illustrating a desired shaping of the vehicle interior and exterior. Utilizing the material gathered, the method includes the further steps of establishing a floor height of a the vehicle to be created, assembling a recreated floor of the vehicle upon the platform structure utilizing the floor console and door sill forms, and then constructing a vehicle superstructure within the cage and utilizing the door sills, panels and roof headliner, as well as installing such forms as an instrument panel, dashboard, steering wheel, seats and the like.

The method also includes the steps of adjusting an overall dimensioning of the platform structure and cage, as well as providing visual and/or audial displays to an occupant seated within the recreated vehicle architecture to provide a virtual tie-in to an external environment of the vehicle.

BRIEF DESCRIPTION OF THE DRAWINGS

Reference will now be made to the attached drawings, when read in combination with the following specification, wherein like reference numerals refer to like parts throughout the several views, and in which.

DESCRIPTION OF THE PREFERRED EMBODIMENTS

Figure 1:
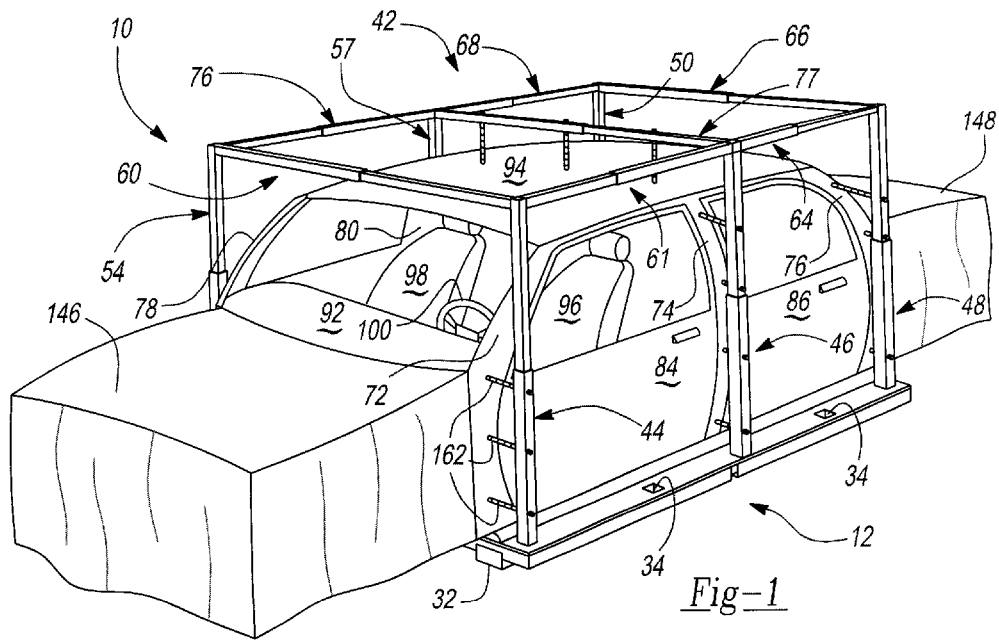
FIG. 1 is a perspective view of the system for recreating a desired vehicle architecture according to the present invention.

Referring now to FIG. 1, a perspective view is illustrated at 10 of the system for recreating a desired vehicle architecture according to the present invention. As previously discussed, the present invention is a novel and simplified approach for use in creating a desired architectural design of a vehicle interior. The invention is primarily directed to the ability to quickly and efficiently create a vehicle interior architecture, utilizing generic forms for such interior components as instrument panels, roof headliner, pillars, door panels, consoles, floor and door sills, and in addition to stylized exterior components such as doors, hood and roof, to provide actual vehicle perspective to an individual seated within the constructed vehicle architecture.

Another key feature of the vehicle architectural system is that it provides for quick and easy adjustment of the forms relative to one another and permits the interior dimensions of the established architecture to be quickly altered for purposes of ergonomic testing. The present invention is also concerned with the provision of a vehicle architectural system which utilizes simplified and inexpensive generic form pieces and which assists in the establishment of the desired interior architecture without other distractions as to an ornamental appearance of either the vehicle interior or exterior.

Figure 2:
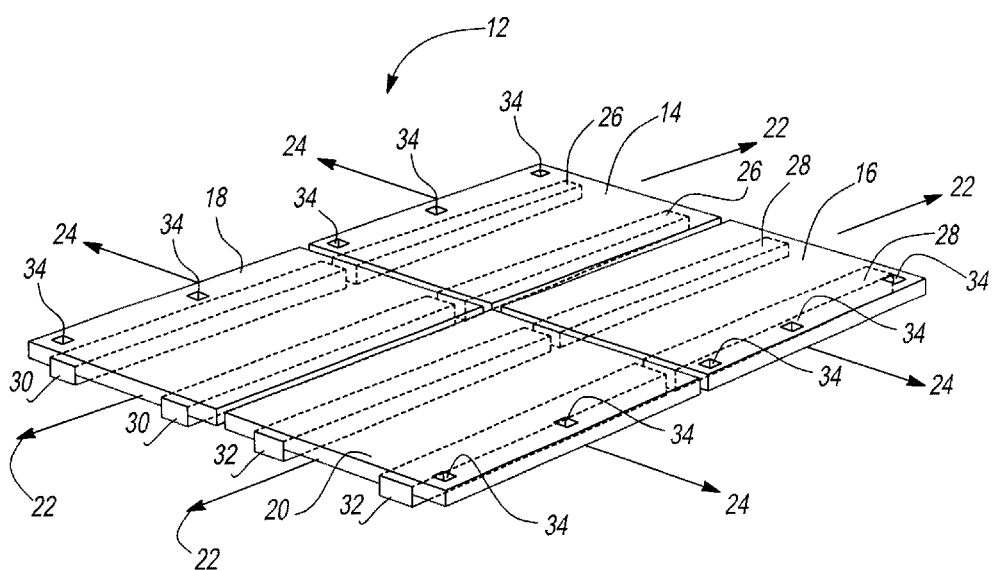
FIG. 2 is a sectional view in perspective of the platform according to the present invention and illustrating the plurality of coplanar and axially translatable floor plates.

Referring again to FIG. 1, and specifically to FIG. 2, the system 10 according to the present invention provides a platform 12 constructed of a plurality of floor plates 14, 16, 18 and 20. Four such floor plates are illustrated in the preferred embodiment, however it is understood that lesser or greater quantities of such floor plates may be employed within the scope of the present invention. Each of the floor plates 14, 16, 18 and 20 is constructed of a generally rectangular shaped material, such as a durable steel or other metal alloy. It is contemplated that the floor plates 14, 16, 18 and 20 be arrayed in coplanar and, in some instances, end to end abutting fashion relative to one another and firther that they be permitted to translate about first and second two-dimensional axes illustrated by arrows 22 and 24 in FIG. 2. To aid in the coplanar and axial translatability of the floor plates, pairs of elongate support members 26, 28, 30 and 32 are provided, respectively, for the floor plates 14, 16, 18 and 20, with each pair of support members being arrayed in spaced apart and parallel extending fashion and cradling thereupon an associated floor plate.

Although the floor plates 14–20 in FIG. 2 are most readily illustrated as being functionally translatable along the first axial direction 22, it is understood that the plates may also be movable in directions specified along axes 24, this being accomplished by employing cross slide architecture within the floor plate design, such as by mounting the pairs of support members 26–32 upon a further platform (not shown) which is movable along the axes 24 or, alternatively, by withdrawing and rotating the support members illustrated in a cross-wise extending fashion to permit the desired axial movement.

Figure 4:
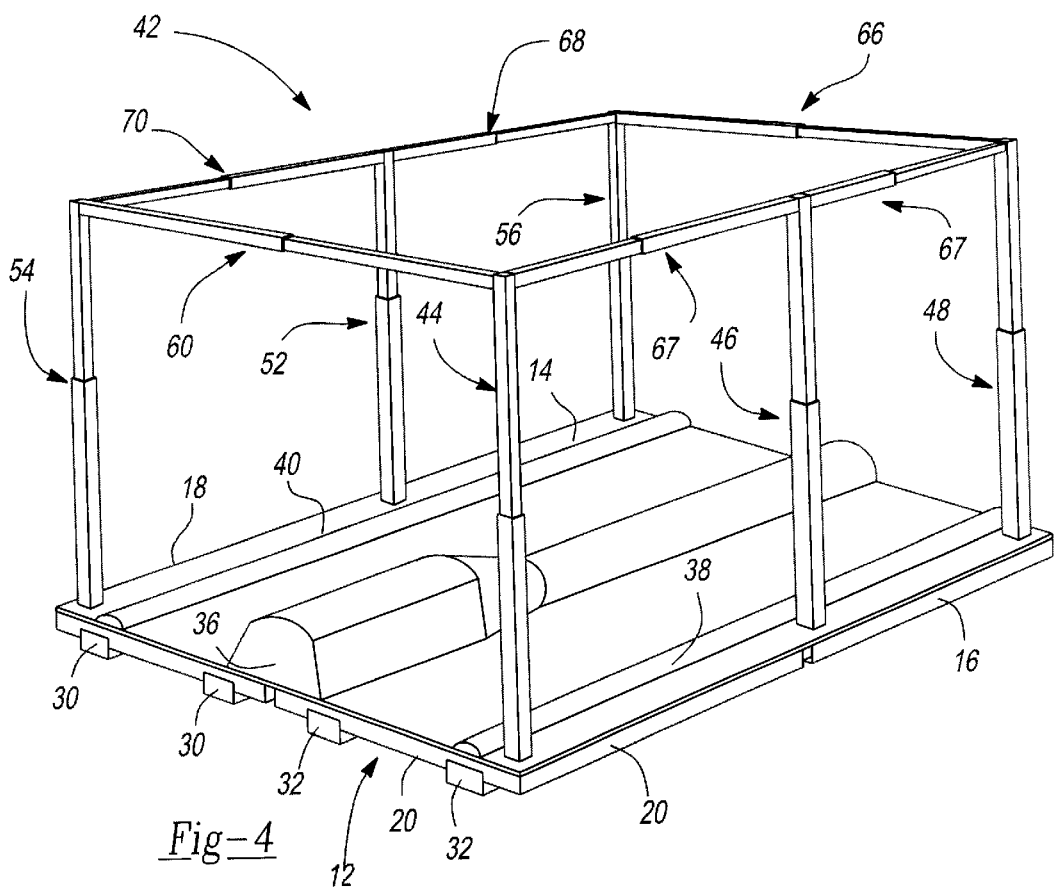
FIG. 4 is a further perspective view illustrating the construction of a cage upon the platform and including both vertically and horizontally interconnecting and axially adjustable supports.

A plurality of mounting apertures 34 are illustrated at specified and spaced apart edge locations and formed through each of the floor plates 14–20. The purpose of the mounting apertures 34 will be readily apparent when reading the further disclosure of FIGS. 1, 4 and 5, taken in combination.

Figure 3:
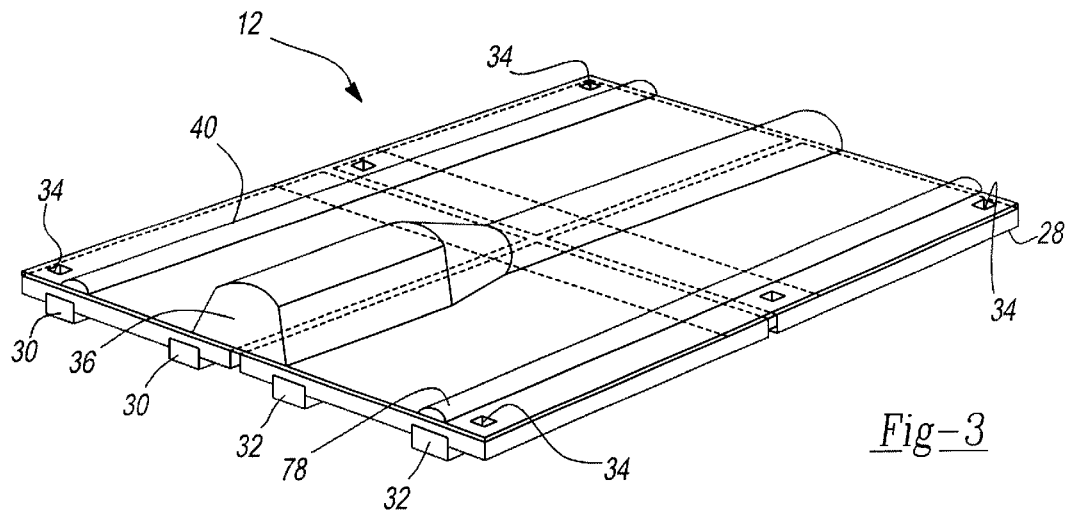
FIG. 3 is a further view, similar to FIG. 2, and illustrating generic floor console and door sill patterns corresponding to a desire vehicle architecture and assembled upon the platform.

FIG. 3 is a view similar to FIG. 2 and further illustrates generic floor console 36 and door sill forms 38 and 40 corresponding to a desire vehicle architecture and assembled upon the platform 12. As was previously disclosed, the generic forms 36, 38, and 40 (in addition to those to be subsequently described) are preferably constructed of a foamable material exhibiting the necessary qualities of flexibility, durability and resilience. The nature of the form patterns employed in the system of the instant invention is that they generally replicate corresponding vehicle components, but do not illustrate any degree of ornamentality such that they would distract from the ability to provide a primarily ergonomic analysis of the vehicle architecture. To this end, the forms are typically covered by a gray or black sheet material or similar colored carpeting. The forms may also be constructed of wooden forms, but are preferably of the foamable material so as to provide the requisite degree of detail and flexibility during adjustment which is sought by the present invention.

Referring again to FIG. 3, the console 36 replicates an elongated member of an actual vehicle which extends axially along the general direction of the car and which accommodates the drive train extending beneath the floor of the vehicle, as well as a shifter rod (not shown) which may be floor mounted to the vehicle. The door sill forms 38 and 40 further replicate the shaping of the floor of the recreated vehicle interior which is proximate to the first and second sides of the vehicle.

Referring further now to FIG. 4, as well as again to FIG. 1, a cage 42 is erected upon the platform 12 and includes first vertically and second horizontally interconnecting and axially adjustable supports. A plurality of the first vertical supports are illustrated at 44, 46, 48, 50, 52, and 54 and each include first and second axially telescoping portions. Specifically, and referring ahead to the enlarged view of FIG. 7, the selected vertical support 52 is again illustrated with first telescoping portion 54 and second telescoping portion 56. A lower extending and phantom portion of the first telescoping portion 54 extends downwardly into the hollow interior cavity of the second telescoping portion 56 and a pin 58 is provided for inserting through aligning apertures (not illustrated) to lock in position the telescoping portions 54 and 56 according to a desired axial arrangement. Each of the vertical supports is further mounted by inserting a lower corresponding end of each of the second telescoping portions into a selected aperture 34 positioned around a periphery of the platform and as is clearly evident from the illustrations of FIGS. 1, 4 and 5.

Figure 7:
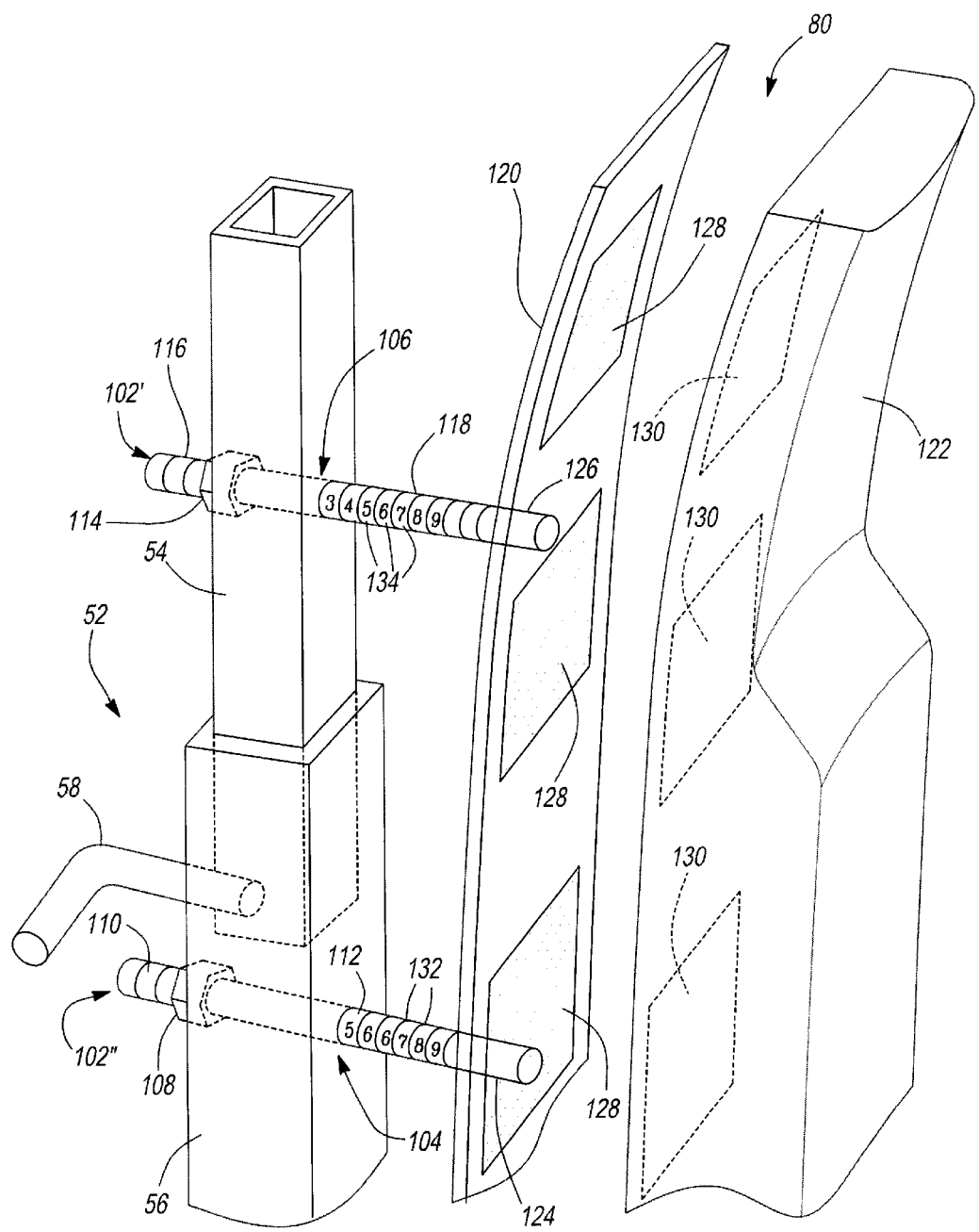
FIG. 7 is an enlarged fractional view taken from the overall sectional view of FIG. 6 and further illustrating both the manner in which strip portions, forming a part of the pillars, are resecurably attached to the door panels, as well as the ability to manually increment or decrement a spacing of the door panel relative to the interior of the cage.

A plurality of the second horizontal supports are illustrated at 60, 62, 64, 66, 68, 70, and 71 and each also includes first and second axially telescoping portions, identically as described with respect to the first plurality of vertical supports and as also referenced in the disclosure of FIG. 7. Referring again to FIGS. 1, 4, and 5, each of the second horizontally extending supports extends in interconnecting fashion between top ends of succeeding and spaced apart vertically extending supports. Specifically, horizontal support 60 extends between top ends of vertical supports 44 and 54, horizontal support 62 extends between vertical supports 44 and 46, horizontal support 64 extends between vertical supports 46 and 48, horizontal support 66 extends between vertical supports 48 and 50, horizontal support 68 extends between vertical supports 52 and 50, horizontal support 70 extends between vertical supports 54 and 52, and horizontal support 71 extends between vertical supports 46 and 52 at a middle and laterally extending location of the cage to in combination define an interior volume to the cage within which a superstructure of the interior vehicle architecture may be constructed as will be subsequently described.

Referring again to FIGS. 1 and 5, a further assembled view of a vehicle architecture superstructure is now illustrated according to the present invention and includes assembly of additional generic forms including upwardly extending vehicle pillars 72, 74, 76, 78, 80 and 82 (see also FIG. 6), the pillars interconnecting door panels 84, 86, 88 and 90. Additional forms include a dashboard 92 which houses an instrument panel, a roof headliner 94, seats 96 and 98 and a steering wheel 100. Although not clearly illustrated, it is understood that additional releasably resecurable appliqués (such as using Velcro attachments) can be employed in the form of gauges, knobs and the like and so as to add a degree of realistic appearance to the constructed interior architecture.

Figure 5:
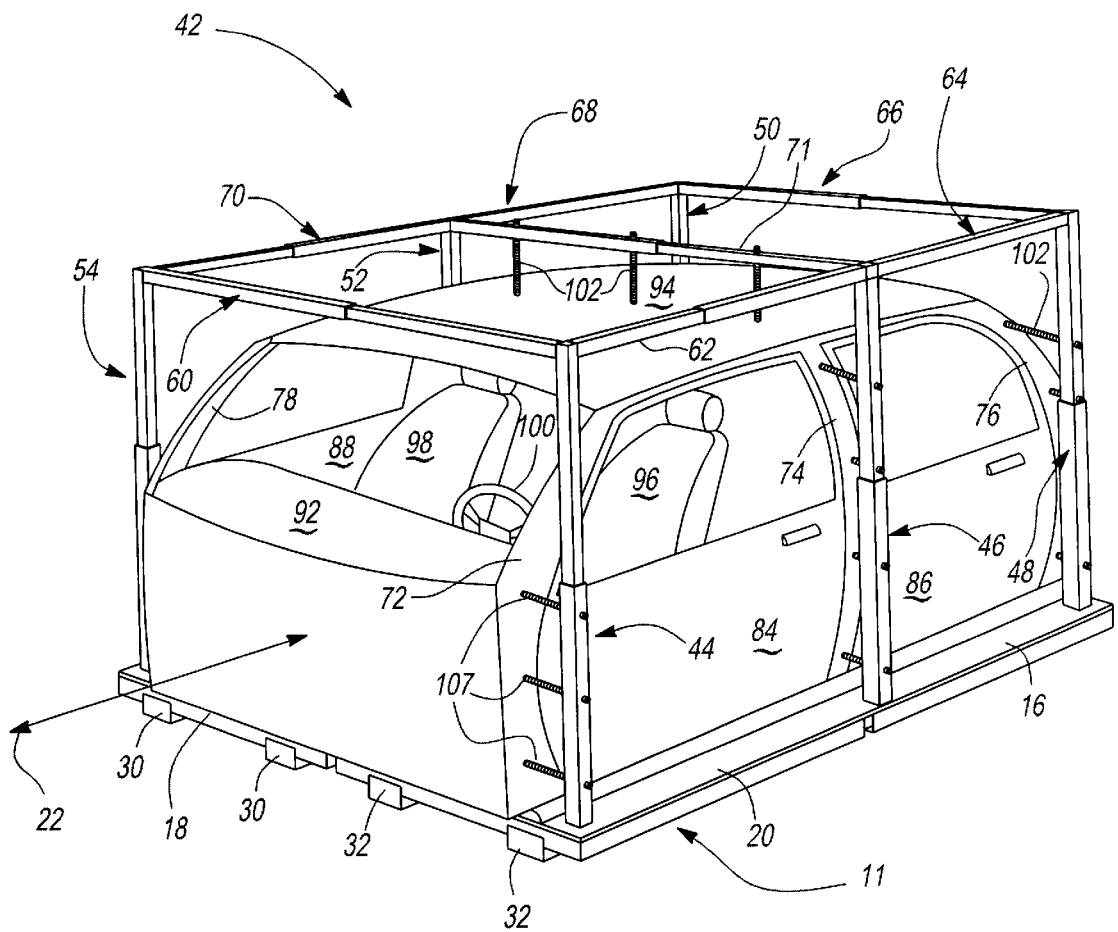
FIG. 5 is a further view illustrating the construction of the vehicle superstructure within the cage and including the provision of additional pillar, door panel, roof headliner, dashboard, seat, and steering wheel patterns according to the present invention.

Adjustable attaching members are illustrated, see at 102, throughout FIGS. 1, 5, 6 and 7 for supporting and positioning the several forms illustrated in FIGS. 1 and 5 against interior surfaces of the cage 42. Referring to FIG. 7, an enlarged view in detail is shown of the ability to interengage selected generic forms, in this instance door panels with releasably securable strip portions to selected interiorly facing locations of the cage.

As illustrated in FIG. 7, a pair of the attaching members are shown at 102' and 102", each of which including an elongate shaft 104 and 106. The shaft 104 of attaching member 102' includes an internally threaded nut 108 which separates the member 102' into a first partially threaded portion 110 and a second extending portion 112. Likewise, the shaft 106 of attaching member 102" includes an internally threaded nut 114 which separates the member 102" into a first partially threaded portion 116 and a second extending portion 118.

Figure 6:
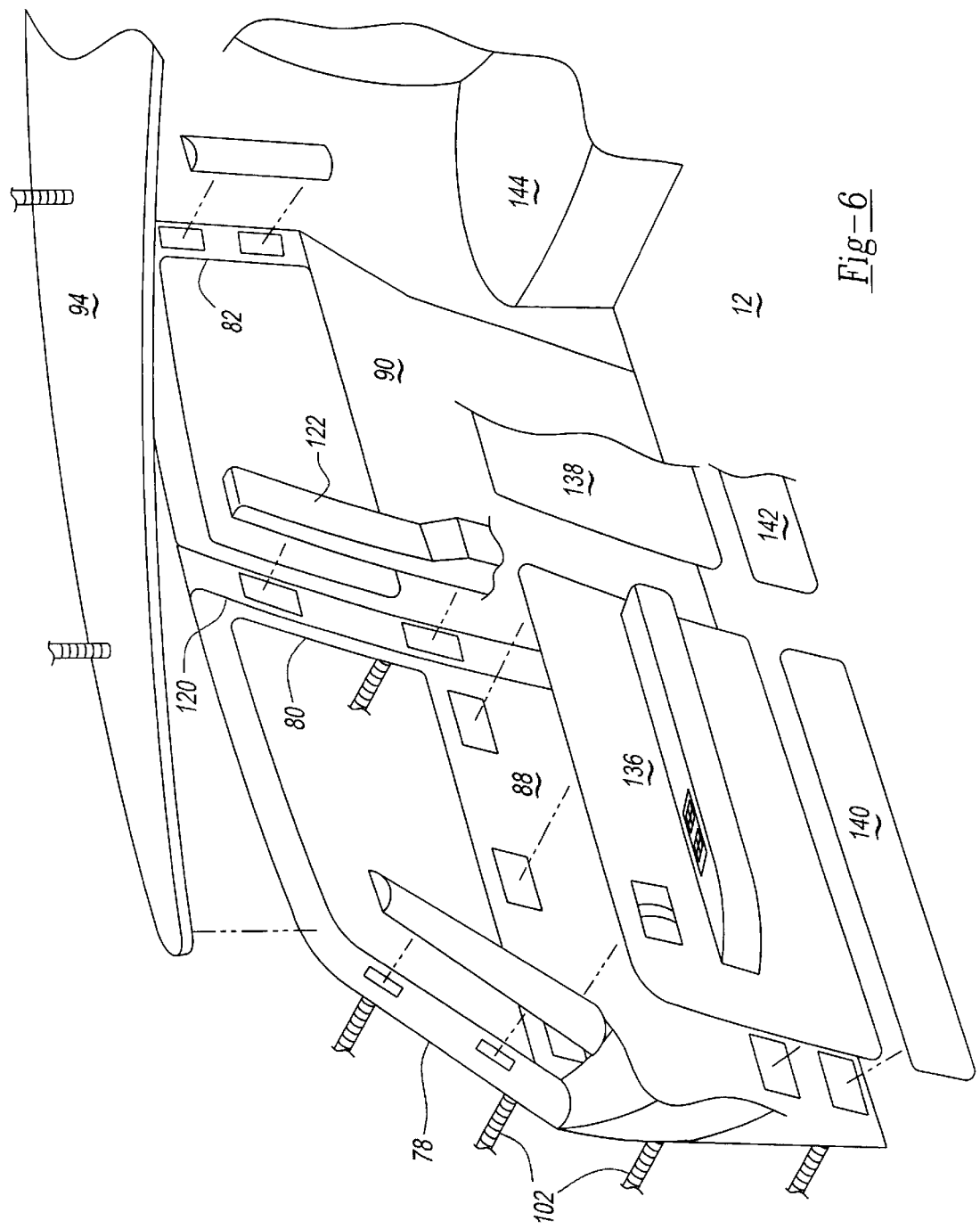
FIG. 6 is a sectional view in exploded fashion and illustrating the manner in which the form patterns are assembled within the cage structure by means of the adjustable elongate shaft portions.

Illustrated also in FIG. 7 is a portion of the pillar 80 illustrated in exploded fashion and including a releasably resecurable strip portion 120 and an underlying portion of the strip portion 122 which in turn may secure a door panel. Remote extending ends of the second extending portions 112 and 118 of attaching members 102' and 102", respectively, secure to selected locations 124 and 126 of the strip portion 120, such as through the use of heavy duty adhesives or other conventional and mechanical attaching means. The strip portion 120 in turn includes the releasably resecurable portions (in this instance Velcro attachments) 128 which interengage with opposingly facing portions 130 defined in aligning fashion along the abutting face of the door panel 122. The elongate shafts 104 and 106 each further include numerical indicia (at 132 and 134) which perform in combination with translational adjustment of the nuts 108 and 114 (through rotation in a given direction via the interengaging threads of the first shaft ends 110 and 116) and so as to redefine an axial positioning of the second ends 112 and 118 of the attaching members 102' and 102" relative to the surface locations of the vertical support 52. FIGS. 1, 5 and 6 generally show the threaded nut portions extending from the rearward sides of each attaching member inserted through the vertically and horizontally extending supports. It is however also envisioned that the interiorly threaded and rotating nuts could be dispensed with in favor or interiorly threading the apertures within the supports and simply rotating the elongate shafts to achieve a desired translational positioning. In this instance, it would also be necessary to achieve some alternative fashion for securing the second ends of the shafts to the various forms and which would permit rotation of shaft ends without disengagement from the forms.

Figure 8:
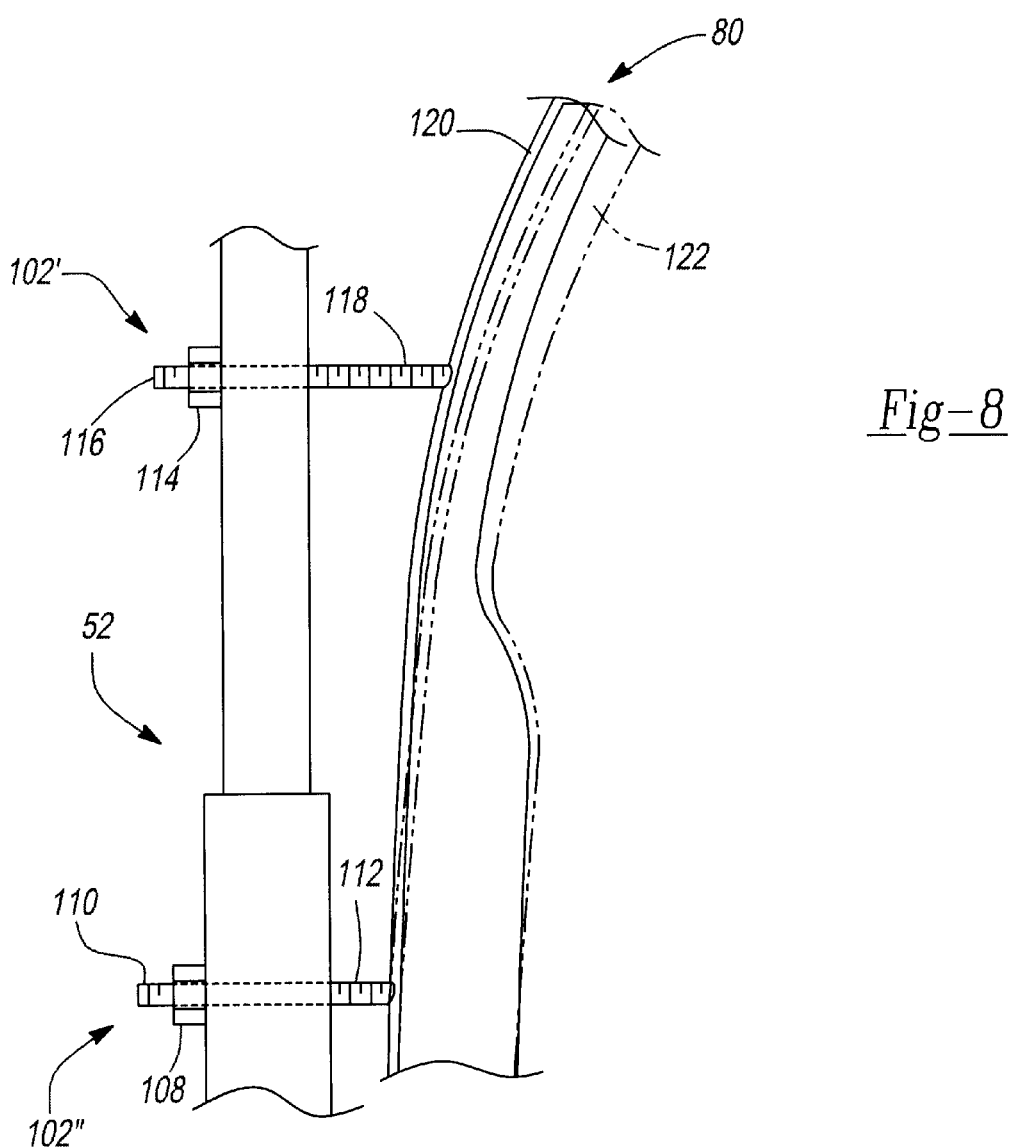
FIG. 8 is a side view of FIG. 7 and exhibiting the flexibility and resiliency aspects of the generic forms utilized in the present invention.

The functioning of the attaching members located along the axially extending sides of the vehicle, as distinguished from the front and rear ends, also provides, to a lesser degree, the function of permitting the architecture forms to be moved laterally inwardly and outwardly along the direction illustrated by arrows 24 in FIG. 2 and provides a further disclosure for accomplishing this type of adjustment. Referring also to FIG. 8, a side view of the general assembly of FIG. 7 is again presented and FIG. 8 illustrates the flexibility and resiliency aspects of the pillar assembly 80 during normal use.

Referring back to FIG. 6, a somewhat enlarged and more general view is shown of the assembly step of attaching a side of an architectural superstructure to selected locations along the cage (not shown in this view) and again illustrates a plurality of the attaching members 102 (both extending from the vertical and horizontal supports of the enclosing cage structure). The pillar and door panel forms associated with a passenger side of the vehicle are illustrated in more or less assembled fashion and again include spaced apart pillars 78, 80 and 82 which supports door panels 88 and 90, the door panels in turn permitting the attachment of additional interior decorative appliqués 136 and 138 illustrating interior facing surfaces of the doors. Additional appliqués include such items as lower strip portions 140 and 142 and seat 144 which is internally mountable upon the platform 12. The roof headliner 94 is again illustrated in FIG. 6 and is adjustably attachable in an overhead fashion upon achieving a selected positioning of the various other generic forms.

The particular objective of FIG. 6 is to illustrate the relative ease in which the architectural analysts can quickly and precisely modify the dimensioning and positioning of the several forms relative to one another and in a manner not previously envisioned. The concept behind the instant invention is to produce such forms as previously disclosed according to reasonably detailed specifications and to experiment with them by adjusting their relative positioning within the cage structure and upon the platform in combination with placing individuals within the interiorly constructed architecture to obtain their comments as to such issues as ergonometry of the vehicle interior, desired leg room and head room dimensioning and the like. The invention further contemplates operative variants in which the generic forms used in the architectural system need only undergo approximately 100 respondent evaluations prior to be discarded in favor of a further array of forms which correspond to a further vehicle design. The additional concept behind the present invention is that it provides for very inexpensive and efficient interior vehicle architecture analysis through the use of the adjustable platform and cage and with varying combinations of form patterns which are quickly and cheaply constructed according to processes known in the art and which are then positionable within the system as previously described. As was again previously stated, it is desirable to construct the generic forms to reasonably precise dimensions and without any undue degree of surface ornamentation, which would otherwise detract emphasis and attention away from the professed objective of ergonometric and dimensional experimentation of the interior vehicle architecture.

Referring again back to FIG. 1, additional hood 146 and trunk 148 forms are illustrated which are constructed, respectively, at the front and rear locations of the platform and cage and which are typically wooden stringers which are generally shaped to match a computer aided design sketch of those portions of the vehicle design which are anticipated. The stringers 146 and 148 typically may be covered by a cloth or other appropriate draped covering.

Figure 9:
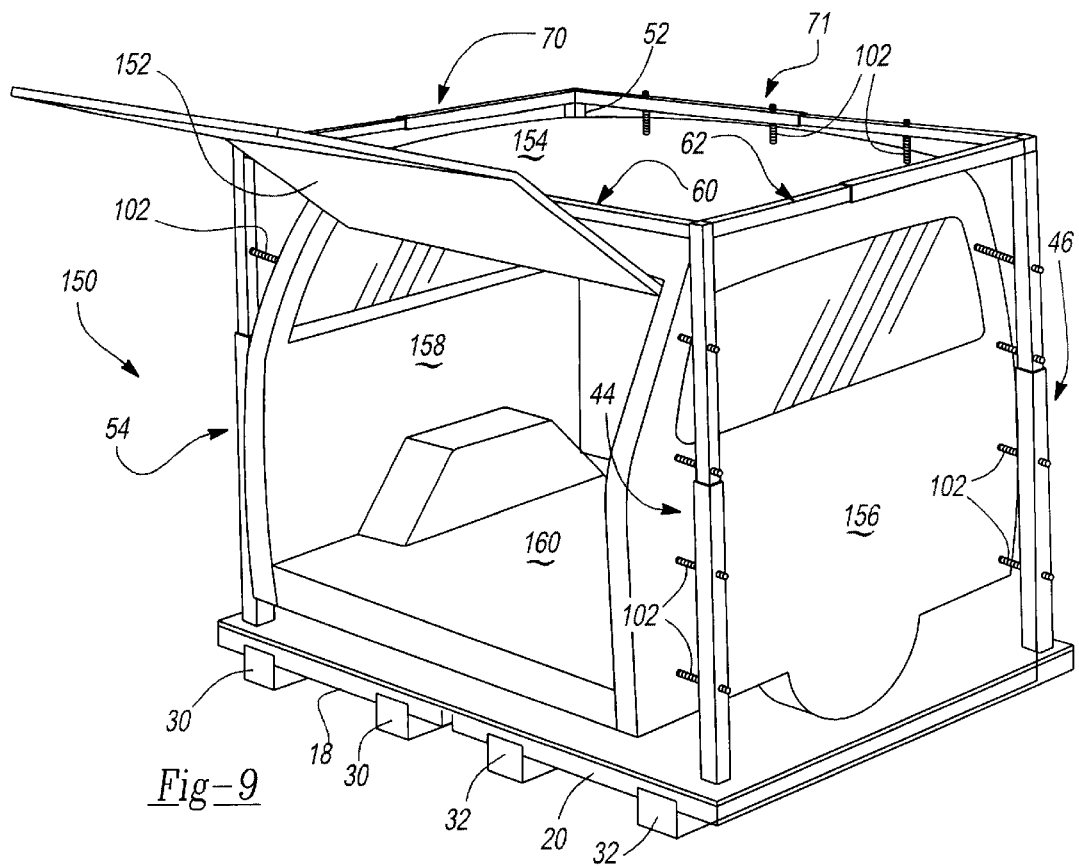
FIG. 9 is an alternate embodiment which illustrates the recreation of a sport utility vehicle interior architecture, and specifically a cargo hold area, according to the present invention.

Referring to FIG. 9, an alternate embodiment 150 is shown which illustrates a recreation of a sport utility vehicle interior architecture. Specifically, the embodiment 150 illustrates a recreated cargo hold area and which requires only half the platform and cage structure of the first embodiment. Namely, the embodiment of FIG. 9 includes only the coplanar and adjustable floor plates 18 and 20, the attachable and vertically extending supports 44, 46, 52 and 54 (defining a forward half of the cage structure as illustrated in the first preferred embodiment) and the interconnecting and horizontally extending supports 60, 62, 70 and 71 which secure between respective top ends of the vertically extending supports.

Additional forms are employed in the embodiment of FIG. 9 in order to recreate the sport utility vehicle interior and include a rear door 152, roof 154, sides 156 and 158 and floor 160. As is shown in FIG. 9, the sides 156 and 158 are secured in the desired spaced and arrayed fashion to the vertically extending supports, again by the attaching members 102, and the roof 154 is likewise secured by additional such attaching members extending downwardly from horizontally extending supports. The rear door 152, roof 154, side 156 and 158 and floor 160 forms are further constructed of a simplified flat black foamable material.

Figure 10:
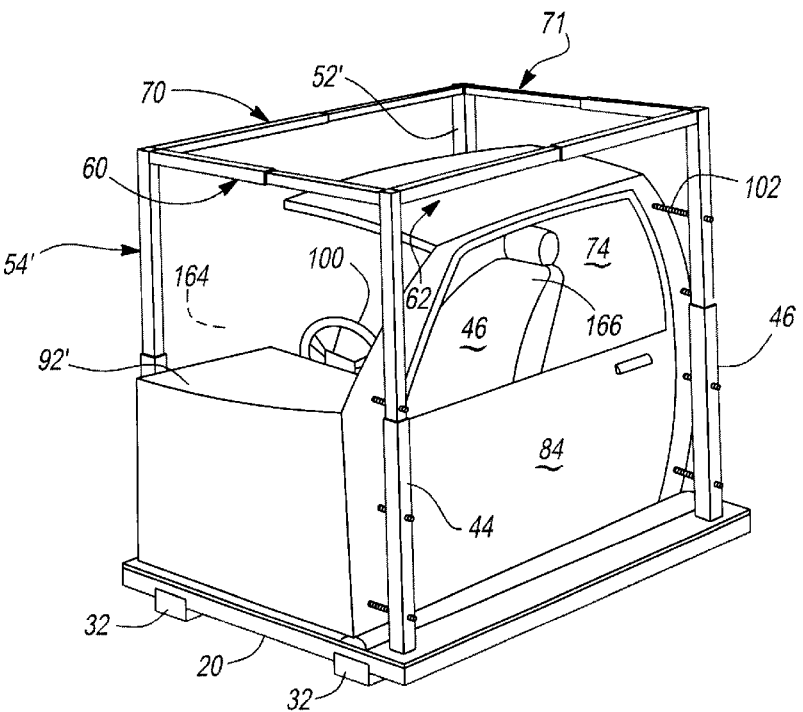
FIG. 10 is a variant of the first preferred embodiment and illustrating an audio/visual virtual tie for use with an occupant seated within the recreated architecture.

Finally, and with reference to FIG. 10, a variant of the first preferred embodiment is illustrated at 162 and illustrates a quarter-sized architectural construction including the provision of a single floor plate 20, vertically extending supports 44, 46, 52' and 54' (these latter two being moved from remote edges of the floor plate 18 and being repositioned at opposite edges of the plate 20). Form patterns such as the door 84, pillar 74, seat 96, steering wheel 100, alternatively configured hood 94' and alternatively configured dashboard 92' are represented in the variant of FIG. 10. An audio/visual virtual tie for use with an occupant seated within the recreated architecture is further illustrated and this is provided by a video display 164 set upon the dashboard in proximity to the driver seat 96 and wheel 100, as well as an audial display provided by headphones 166 set upon the seat 96. The purpose of the audio/visual means is to provide a virtual reality tie-in to a testing occupant seated within the vehicle to the exterior of the vehicle architecture.

A method for recreating a vehicle interior according to the present invention is also disclosed and includes the steps of obtaining a set of critical dimensions of a desired vehicle interior configuration and obtaining computer aided artwork illustrating a desired shaping of the vehicle interior and exterior. Further steps include the establishing of a floor height of the vehicle to be created and assembling a recreated floor of the vehicle upon a platform structure. The floor includes the provision of a first set of generic form patterns selected from a group including door sills, floor consoles and a cargo floor. Further steps include the constructing of a vehicle superstructure upon the floor, the superstructure including the provision of a second set of generic form patterns selected from the group including an instrument panel, dashboard, steering wheel, roof headliner, pillars, doors and seats. The step of constructing further includes the step of securing selected generic form patterns to selected locations of a cage erected upon said platform structure and so that the second set of form patterns are assembled in a desired array. Finally, the step of adjusting a relative positioning of the first and second sets of form patterns with regard to one another is accomplished to recreate a desired interior architecture. Additional steps again include adjusting an overall dimensioning of said platform structure and said cage and providing visual and audio displays to an occupant seated within said recreated interior architecture so as to provide a virtual tie-in to an external environment of said vehicle.

It is therefore apparent that the present invention discloses a novel and useful architectural system and method of manufacture for constructing in quick and efficient fashion a replication of a vehicle interior according to desired dimensional specification and ergonometric aspects. The present invention further provides for easy adjustment of the forms relative to the platform and cage.

Having described my invention, additional embodiments will become apparent to those skilled in the art to which it pertains without deviating from the scope of the appended claims.

What is claimed is:

1. An architectural system for adjustably recreating a vehicle interior, comprising:

a platform constructed of a plurality of planar shaped floor plates which are arrayed in end-to-end and coplanar fashion, said floor plates each being translatable relative to one another and along at least one of first and second axis so as to establish an overall surface area of said platform;

a cage constructed of a first plurality of elongate and vertically extending supports extending upwardly from said platform, said cage further including a second plurality of likewise elongate and horizontally extending supports which interconnect top ends of said first plurality of vertically extending supports, each of said first and second pluralities of extending supports further being axially adjustable in length so as to define an specified interior volume of said cage;

a series of generic forms dimensioned to correspond to selected interior and exterior components of motor vehicle; and adjustable attaching means for securing said forms both upon said platform and within said specified interior volume of said cage;

said system providing for quick and easy adjustment of said forms relative to one another according to desired dimensions and permitting the recreation of the vehicle interior to be quickly altered for purposes of ergonomic testing.

2. The architectural system as described in claim 1, said floor plates each further comprising a generally rectangular shape and being mounted upon elongate support members for cross slide movement along two axes.

3. The architectural system as described in claim 1, further comprising mounting apertures formed within said floor plates and at specified locations along edges of said plates, a bottom inserting end of each of said selected vertically extending support securing within a specified mounting aperture.

4. The architectural system as described in claim 3, each of said first and second pluralities of extending supports further comprising first and second respective telescoping portions.

5. The architectural system as described in claim 1, said series of generic forms being selected from the group including an instrument panel, dashboard, roof headliner, pillars, console, floor sills, door sills, and door panels.

6. The architectural system as described in claim 5, each of said forms being constructed of a durable and foamable material.

7. The architectural system as described in claim 6, said forms being covered by a stretchable and solid colored fabric.

8. The architectural system as described in claim 5, said consoles, floor sills and door sills being supported at selected locations upon said platform.

9. The architectural system as described in claim 5, said roof headliners, pillars, instrument panels and doors being adjustably attached to said first and second extending supports at specified locations.

10. The architectural system as described in claim 9, said adjustable attaching means further comprising a plurality of elongated shafts, each of said shafts including a partially threaded first portion which receives a threaded nut, said nut separating said shaft into said first portion and a second portion, each of said threaded nuts abutting against an exterior facing surface of a selected elongate extending support of said cage, said associated second shaft portions extending inwardly through apertures in said elongate supports and engaging selected locations of said associated forms.

11. The architectural system as described in claim 10, further comprising indexable indicia located in dimensioned increments along each of said second portions of said elongated shafts, said threaded nuts being rotated to adjust a desired length of said second portions to adjust an arrayed positioning of an associated form within said cage.

12. The architectural system as described in claim 11, said door pillars each further including a strip portion having adhesive portions thereon, said second portions of said elongated shafts attaching to an exterior location of said strip portions, said adhesive portions permitting said strip portions to be secured to said door panels.

13. The architectural system as described in claim 12, said strip portions and said door pillars exhibiting a degree of flexibility and resiliency.

14. The architectural system as described in claim 5, said generic forms further comprising seats, steering wheel, hood and trunk forms, said hood and trunk forms extending in forward and rearward directions, respectively, from said cage and further including wooden patterns covered by a stretchable fabric material.

15. The architectural system as described in claim 14, further comprising a projection screen placed upon said dashboard in proximity to said instrument panel, said screen establishing a virtual tie-in between said interior architecture and an exterior of said recreated architecture.

16. The architectural system as described in claim 1, said series of generic forms further comprising a rear door, roof, sides and floor recreating a sport utility vehicle and for constructing an interior architecture of a cargo hold area.

* * * * *